(12) United States Patent
Oguma et al.

(10) Patent No.: US 10,661,782 B2
(45) Date of Patent: May 26, 2020

(54) OPERATION CONTROL SYSTEM FOR HYBRID VEHICLE

(71) Applicant: MITSUBISHI JIDOSHA KOGYO KABUSHIKI KAISHA, Tokyo (JP)

(72) Inventors: Takahiro Oguma, Tokyo (JP); Shigetoshi Hirano, Tokyo (JP); Tadayoshi Hirao, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 269 days.

(21) Appl. No.: 15/667,028

(22) Filed: Aug. 2, 2017

(65) Prior Publication Data

US 2018/0072307 A1 Mar. 15, 2018

(30) Foreign Application Priority Data

Sep. 15, 2016 (JP) ................... 2016-180586

(51) Int. Cl.
*B60W 20/20* (2016.01)
*B60W 30/18* (2012.01)
(Continued)

(52) U.S. Cl.
CPC ............ *B60W 20/20* (2013.01); *B60K 6/442* (2013.01); *B60L 7/16* (2013.01); *B60L 58/12* (2019.02);
(Continued)

(58) Field of Classification Search
None
See application file for complete search history.

(56) References Cited

U.S. PATENT DOCUMENTS 5,786,640 A * 7/1998 Sakai ................. B60K 6/46
290/17
6,155,954 A 12/2000 Itoyama et al.
(Continued)

FOREIGN PATENT DOCUMENTS

| EP | 3 064 410 A1 | 7/2016 |
|---|---|---|
| JP | 2012-106536 A | 6/2012 |
| WO | WO 2014/123784 A1 | 8/2014 |

OTHER PUBLICATIONS

European Search Report dated Dec. 8, 2017 issued in corresponding EP Application No. EP 17 19 0214.
(Continued)

*Primary Examiner* — Abby Y Lin
*Assistant Examiner* — Edward Torchinsky
(74) *Attorney, Agent, or Firm* — Birch, Stewart, Kolasch & Birch, LLP.

(57) ABSTRACT

An operation control system for a hybrid vehicle capable of causing the vehicle to travel in parallel mode in which front wheels of the vehicle are driven by an engine and a front motor, capable of fuel cut control to stop fuel supply to the engine during deceleration of the vehicle, and capable of regenerative braking using the front motor, wherein when the vehicle traveling in parallel mode is to be decelerated and SOC of a traction battery is lower than or equal to an electricity-generation determination lower limit value Sbu, Sbd, a hybrid control unit performs first charging promotion control to brake the vehicle by regenerative braking while causing the engine to continue operating by continuing fuel supply.

7 Claims, 2 Drawing Sheets

(51) Int. Cl.
*B60W 20/00* (2016.01)
*B60K 6/442* (2007.10)
*B60L 58/12* (2019.01)
*B60L 7/16* (2006.01)
*B60W 10/02* (2006.01)
*B60W 10/06* (2006.01)
*B60W 10/08* (2006.01)
*B60W 10/18* (2012.01)

(52) U.S. Cl.
CPC ............ *B60W 10/02* (2013.01); *B60W 10/06* (2013.01); *B60W 10/08* (2013.01); *B60W 10/18* (2013.01); *B60W 20/00* (2013.01); *B60W 30/18127* (2013.01); *B60L 2240/423* (2013.01); *B60L 2240/443* (2013.01); *B60L 2240/507* (2013.01); *B60L 2260/26* (2013.01); *B60L 2260/28* (2013.01); *B60W 2510/244* (2013.01); *B60W 2540/10* (2013.01); *B60W 2710/021* (2013.01); *B60W 2710/0627* (2013.01); *B60W 2710/0666* (2013.01); *B60W 2710/083* (2013.01); *Y02T 10/6234* (2013.01); *Y02T 10/6286* (2013.01); *Y10S 903/93* (2013.01)

(56) References Cited

U.S. PATENT DOCUMENTS

| | | |
|---|---|---|
| 2009/0171523 A1 | 7/2009 | Luo et al. |
| 2014/0048345 A1 | 2/2014 | Trueman |
| 2016/0059844 A1 | 3/2016 | Ikedaya et al. |
| 2016/0368482 A1* | 12/2016 | Shahverdi .............. B60L 50/50 |

OTHER PUBLICATIONS

Foreign Office Action of EP 17 190 214.1 dated Feb. 10, 2020.
Foreign Office Action of JP 2016-180586 dated Feb. 5, 2020.

\* cited by examiner

OPERATION CONTROL SYSTEM FOR HYBRID VEHICLE

BACKGROUND OF THE INVENTION

Field of the Invention

The present invention relates to a technique of controlling operation of a generator and an internal combustion engine mounted on a hybrid vehicle.

Description of the Related Art

Among hybrid vehicles developed in recent years, there is known a type which comprises an engine (internal combustion engine), a generator driven by the internal combustion engine to generate electricity, a traction battery chargeable by electricity supply from the generator, and a traction motor supplied with electricity from the traction battery or the generator to drive drive-wheels.

In hybrid vehicles of this type, electricity generated by the generator is supplied to the traction battery and the traction motor. In vehicle deceleration, electricity is generated by regenerative braking using the traction motor, wherein the generated electricity can be supplied to the traction battery for charging.

Further, as shown in Japanese Unexamined Patent Application Publication No. 2014-121963, hybrid vehicles capable of switching between EV mode, series mode and parallel mode have been developed. In parallel mode, the vehicle is driven by both the internal combustion engine and the motor. Parallel mode is thus used, for example in high-speed traveling requiring high output.

Among vehicles provided with parallel mode, there are vehicles in which, when the output torque required of the internal combustion engine exceeds an appropriately-predetermined electricity-generation upper limit torque during traveling in parallel mode, control is performed to stop electricity generation by the generator while causing the internal combustion engine to continue driving the drive wheels. Stopping the electricity generation this way can suppress load on the internal combustion engine, thereby reducing fuel consumption.

However, when the electricity generation by the generator is stopped because the output torque required of the internal combustion engine exceeds the electricity-generation upper limit torque during high-load traveling in parallel mode, SOC of the traction battery decreases due to electricity consumption by the traction motor. There is therefore a problem that when high-speed traveling continues for a long time, the traction battery experiences a great decrease in SOC.

SUMMARY OF THE INVENTION

An object of the present invention is to provide an operation control system for a hybrid vehicle which can suppress a decrease in SOC of the traction battery during traveling in parallel mode.

In order to achieve this object, an operation control system for a hybrid vehicle according to the present invention comprises an internal combustion engine mounted on the vehicle to drive drive-wheels of the vehicle, a generator driven by the internal combustion engine to generate electricity, a traction battery chargeable by electricity supply from the generator, and an electric motor supplied with electricity from the generator or the traction battery to drive the drive wheels, and is capable of causing the vehicle to travel in parallel mode in which the drive wheels are driven by the internal combustion engine and the electric motor, capable of fuel cut control to stop fuel supply to the internal combustion engine during deceleration of the vehicle, and capable of regenerative braking using the electric motor, wherein the operation control system further comprises an SOC detecting section to detect SOC of the traction battery, and a charging promotion control section to perform, when the vehicle traveling in parallel mode is to be decelerated and the SOC is lower than or equal to a predetermined first reference value, first charging promotion control to brake the vehicle by regenerative braking while causing the internal combustion to continue operating by continuing fuel supply.

In the present invention, when the vehicle is to be decelerated in parallel mode and the SOC of the traction battery is lower than or equal to the first reference value, regenerative braking is conducted while causing the internal combustion engine to continue operating by continuing fuel supply. This increases opportunities for regenerative braking.

Accordingly, when the vehicle having been traveling in parallel mode at high speed for a long time is decelerated because of a preceding vehicle's deceleration, a downhill or other reasons, charging of the traction battery is promoted, so that a decrease in SOC of the traction battery during traveling in parallel mode is suppressed.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

Referring to the accompanying drawings, an operation control system for a hybrid vehicle in an embodiment of the present invention will be described below.

Figure 1:
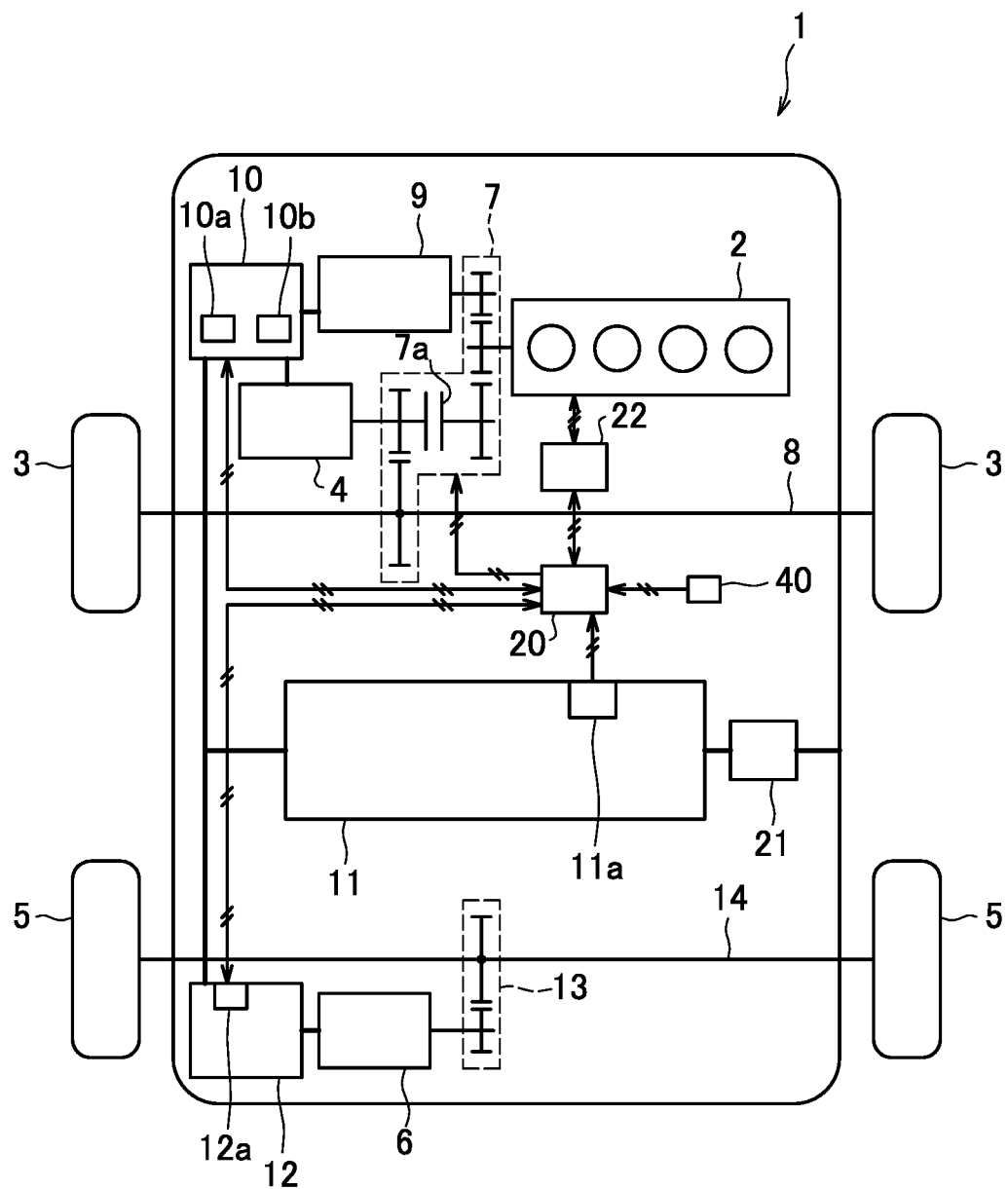
FIG. 1 is a diagram schematically showing the configuration of a plug-in hybrid vehicle to which an embodiment of the present invention is applied.

FIG. 1 is a diagram schematically showing the configuration of a plug-in hybrid vehicle (hereinafter referred to as "vehicle 1") to which an embodiment of the present invention is applied.

In the present embodiment, the vehicle 1 is a four-wheel drive vehicle which can travel by an engine 2 (internal combustion engine) driving front wheels 3 (drive wheels) and which also comprises a front electric motor 4 (electric motor) to drive the front wheels 3 and a rear electric motor 6 (electric motor) to drive rear wheels 5 (drive wheels).

The engine 2 can drive a drive axle 8 for the front wheels 3 via a speed reducer 7 and also can drive a generator 9 to generate electricity.

The front motor 4 is supplied with high-voltage electricity from a traction battery 11 mounted on the vehicle 1 and the generator 9 via a front inverter 10 to drive the drive axle 8 for the front wheels 3 via the speed reducer 7. The speed reducer 7 includes a clutch 7a capable of breaking and completing a power transmission line between the output shaft of the engine 2 and the drive axle 8 for the front wheels 3.

The rear motor 6 is supplied with high-voltage electricity from the traction battery 11 and the generator 9 via a rear inverter 12 to drive a drive axle 14 for the rear wheels 5 via a speed reducer 13.

Electricity generated by the generator 9 can be supplied to the traction battery 11 via the front inverter 10 for charging, and also can be supplied to the front motor 4 and the rear motor 6.

The traction battery 11 comprises a cell module, not shown, including a plurality of rechargeable cells, such as lithium ion cells, held together, and a battery monitoring unit 11a (SOC detecting section) which monitors how much the cell module is charged (State of Charge, referred to as "SOC"), temperature and so on.

The front inverter 10 comprises a front motor control unit 10a and a generator control unit 10b (charging promotion control section, electricity-generation restricting section). The front motor control unit 10a controls output of the front motor 4 based on a control signal from a hybrid control unit 20 (charging promotion control section, target output torque calculating section, electricity-generation restricting section). The generator control unit 10b has a function of controlling output of (electricity generated by) the generator 9 based on a control signal from the hybrid control unit 20.

The rear inverter 12 comprises a rear motor control unit 12a. The rear motor control unit 12a has a function of controlling output of the rear motor 6 based on a control signal from the hybrid control unit 20.

The vehicle 1 is also equipped with a charger 21 for charging the traction battery 11 from an external source of electricity The hybrid control unit 20 is a controller to perform integrated control over the vehicle 1, and comprises an input/output device, a memory device (ROM, RAM, non-volatile RAM, etc.), a central processing unit (CPU), a timer counter, etc.

To the input of the hybrid control unit 20, the battery monitoring unit 11a of the traction battery 11, the front motor control unit 10a and the generator control unit 10b of the front inverter 10, the rear motor control unit 12a of the rear inverter 12, an engine control unit 22 for controlling operation of the engine 2, and an accelerator position sensor 40 for detecting accelerator depression quantity are connected so that information detected by or information about operation of these devices is delivered to the hybrid control unit.

To the output of the hybrid control unit 20, the front motor control unit 10a and the generator control unit 10b of the front inverter 10, the rear motor control unit 12a of the rear inverter 12, the speed reducer 7 (clutch 7a) and the engine control unit 22 are connected.

The hybrid control unit 20 calculates vehicle required output, or output required for propulsion of the vehicle, based on a variety of information detected by the accelerator position sensor 40, etc. and a variety of information about operation, selects a travel mode (EV mode (electric vehicle mode), series mode, parallel mode), and controls outputs of the engine 2, the front motor 4, the rear motor 6 and the generator 9 by sending control signals to the engine control unit 22, the front motor control unit 10a, the generator control unit 10b, the rear motor control unit 12a and the speed reducer 7.

In EV mode, with the engine 2 stopped, the vehicle travels by the front motor 4 and the rear motor 6 driven by electricity supplied from the traction battery 11.

In series mode, with the clutch 7a of the speed reducer 7 disengaged, the generator 9 is driven by the engine 2, and the vehicle travels by the front motor 4 and the rear motor 6 driven by electricity generated by the generator 9 or supplied from the traction battery 11. In series mode, the engine 2 is set to a target rpm, and electricity generated by excess engine output is supplied to the traction battery 11 for charging.

In parallel mode, with the clutch 7a of the speed reducer 7 engaged, the front wheels 3 are driven by mechanically transmitting power from the engine 2 to them via the speed reducer 7. The vehicle 1 travels also by the front motor 4 and the rear motor 6 driven by electricity generated by the generator 9 driven by the engine 2 or supplied from the traction battery 11.

The hybrid control unit 20 selects parallel mode in an operating region in which the engine 2 operates with high efficiency, such as a high-speed region. In the operating regions other than that for which parallel mode is selected, namely middle or low-speed regions, the hybrid control unit 20 switches between EV mode and series mode based on SOC of the traction battery 11.

The hybrid control unit 20 then calculates total output required for propulsion of the vehicle 1 based on accelerator depression quantity, engine rpm, etc. and apportions the total required output to the front motor 4 and the rear motor 6 in EV mode and series mode, and to the front motor 4, the engine 2 and the rear motor 6 in parallel mode. Then, the hybrid control unit 20 determines required torques (target output torques) for the front motor 4, the engine 2 and the rear motor 6, respectively, based on portions of the total required output allotted to them, respectively, the gear ratio of the speed reducer 7 in power transmission from the front motor 4 to the front wheels 3, and the gear ratio of the speed reducer 13 in power transmission from the rear motor 6 to the rear wheels 5, and sends command signals to the front motor control unit 10a, the rear motor control unit 12a and the engine control unit 22 so that the front motor 4, the engine 2 and the rear motor 6 can produce their own required torques. "Target output torque calculating section" in the present invention refers to a functional section corresponding to the function of calculating the required torque for the engine 2, among the above-mentioned control functions of the hybrid control unit 20.

Further, the hybrid control unit 20 and the engine control unit 22 perform a fuel cut function (fuel cut control) to stop fuel supply when torque required for propulsion of the vehicle 1 decreases to a fuel-cut torque Tfc or below.

In the present embodiment, the vehicle 1 is capable of regenerative braking which produces deceleration effect by transmitting rotation of the front wheels 3 and the rear wheels 5 to the front motor 4 and the rear motor 6, thereby forcibly driving the front motor 4 and the rear motor 6 to generate electricity (electricity generation by regenerative braking).

In the present embodiment, the hybrid control unit 20 further has an electricity consumption suppressing function to suppress, in deceleration in parallel mode, consumption of electricity from the traction battery 11 by engine operation control, electricity generation control over the generator 9, and regenerative braking control.

Figure 2:
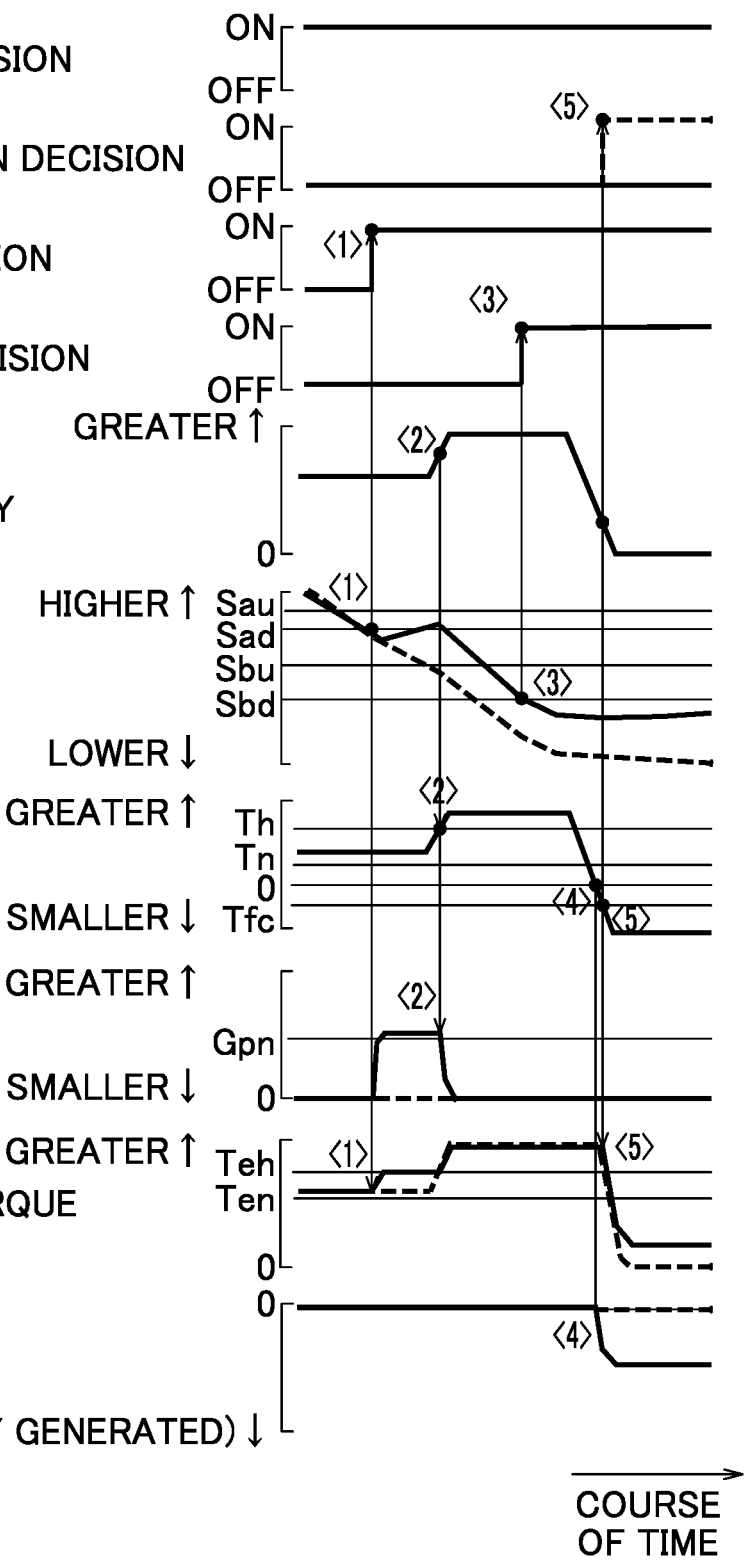
FIG. 2 is a time chart for explaining an electricity consumption suppressing function, which shows, by way of example, how decisions and parameters vary.

FIG. 2 is a time chart for explaining the electricity consumption suppressing function, which shows, by way of example, how decisions and parameters vary. Specifically, FIG. 2 shows, by way of example, how decisions, accelerator depression quantity, SOC of the traction battery 11, torque required for propulsion of the vehicle 1, parallel-mode electricity generation quantity (electricity generated by the generator 9 in parallel mode), required engine torque, and motor torque (sum of output torques of the front motor 4 and the rear motor 6) vary during high-speed traveling in parallel mode.

In FIG. 2, how, in an example of the present invention, decisions and parameters vary when the accelerator is depressed ("ON") and released ("OFF") during traveling in parallel mode is indicated by solid lines. Further, in a comparative example in which an electricity-generation upper limit torque is fixed regardless of SOC of the traction battery 11 and in which even at low SOC, control is not performed to increase parallel-mode electricity generation quantity, cause the engine to continue operating and increase electricity generated by regenerative braking, how decisions and parameters vary is indicated by broken lines. The electricity-generation upper limit torque (referred to as "threshold" in the present invention) is a required engine torque threshold at or above which electricity generation by the generator 9 in parallel mode is stopped ("OFF"). "Electricity-generation restricting section" in the present invention refers to a functional section corresponding to the function of restricting electricity generation by the generator 9 when the required engine torque (target output torque for the engine 2) is greater than or equal to the electricity-generation upper limit torque.

As shown in FIG. 2, in traveling in parallel mode, while the SOC of the traction battery 11 is higher than a reference value for determining SOC decrease (hysteresis lower value) Sad (second reference value), parallel-mode electricity generation quantity (electricity generated by the generator 9 in parallel mode) is kept at zero. This reduces load on the engine 2, thereby reducing fuel consumption. Thus, as a result of driving the motors 3 and 6, the SOC of the traction battery 11 decreases gradually (until <1> in FIG. 2).

In the present embodiment, when the SOC of the traction battery 11 decreases to the SOC decrease determination reference value (hysteresis lower value) Sad or below so that it is determined that the SOC has decreased (SOC decrease decision "ON"), the electricity-generation upper limit torque is changed from a normal setting value Ten to a higher setting value Teh. When the SOC of the traction battery 11 is lower than or equal to the SOC decrease determination reference value (hysteresis lower value) Sad and the required engine torque is less than the electricity-generation upper limit torque (here set at the higher setting value Teh), parallel-mode electricity generation quantity is increased from zero to a predetermined normal electricity generation quantity Gpn. Consequently, the SOC increases gradually (solid line from <1> to <2> in FIG. 2). The normal electricity generation quantity Gpn may be varied depending on a difference between the electricity-generation upper limit torque and the torque required for propulsion.

Conventionally (in the comparative example), the electricity-generation upper limit torque is fixed to the normal setting value Ten. Thus, while the required engine torque is greater than or equal to the electricity-generation upper limit torque (normal setting value Ten), the parallel-mode electricity generation quantity is kept at zero. Thus, in the conventional example, the SOC continues decreasing gradually (broken line from <1> to <2> in FIG. 2).

In this situation, if the driver depresses the accelerator to accelerate the vehicle, the torque required for propulsion increases, and when it increases to the electricity-generation upper limit torque Teh or above, the parallel-mode electricity generation quantity is reduced to zero. Consequently, the SOC decreases gradually (from <2> onward in FIG. 2).

When the SOC of the traction battery 11 decreases to an electricity-generation determination lower limit value (hysteresis lower value) Sbd (first reference value) or below so that it is determined that the SOC has reached the lower limit (SOC lower limit decision "ON"), fuel cut is inhibited (<3> in FIG. 2).

Here, suppose that the driver requests deceleration so that the acceleration depression quantity reduces. When the torque required for propulsion reduces to a negative below zero, the motor torque is gradually reduced below zero, namely braking effect is produced by regenerative braking (<4> in FIG. 2)

Consequently, the SOC is increased by electricity generated by regenerative braking (solid line from <4> onward in FIG. 2). In the comparative example, even when the torque required for propulsion reduces to a negative, the motor torque stays at zero because electricity generation by regenerative braking is not conducted. Consequently, the SOC does not increase.

Even when the torque required for propulsion reduces to the fuel-cut torque Tfc or below, if the SOC of the traction battery 11 is lower than or equal to the electricity-generation determination lower limit value (hysteresis lower value) Sbd, fuel cut is inhibited and the engine 2 is caused to continue operating to produce an engine torque virtually canceling out a friction torque occurring in the engine 2 (solid line from <5> onward in FIG. 2).

In the conventional example, by contrast, when the torque required for propulsion reduces to the fuel-cut torque Tfc or below, it is determined that fuel cut is allowable (fuel cut permission decision "ON"), so that fuel supply is stopped (broken line from <5> onward in FIG. 2).

As stated above, in the present embodiment, when the SOC of the traction battery 11 decreases to the electricity-generation determination lower limit value Sbd or below during traveling in parallel mode, fuel cut is inhibited. When the torque required for propulsion decreases to zero or below, electricity is generated by regenerative braking, namely producing a negative motor torque. Accordingly, the first charging promotion control is performed to increase electricity generated by regenerative braking by inhibiting fuel cut, thereby causing the engine to continue operating to produce a torque virtually cancelling out a friction torque in the engine. In the comparative example, as shown from <5> onward in FIG. 2, when the torque required for propulsion reduces to the fuel-cut torque Tfc or lower, fuel cut is conducted and electricity generation by regenerative braking using the motors is not conducted because deceleration effect is obtained from the friction torque in the engine. Consequently, the SOC of the traction battery 11 decreases. In the present invention, however, by the first charging promotion control, engine torque does not produce deceleration effect. This allows increased electricity to be generated by regenerative braking using the motors, resulting in increase in SOC of the traction battery 11 as shown from <5> onward in FIG. 2.

Further, in the present embodiment, when the SOC of the traction battery 11 decreases to the SOC decrease determination reference value or below, second charging promotion control is performed to set the electricity-generation upper limit torque to the higher setting value Teh predetermined to be higher than the normal setting value Ten. When the required engine torque is greater than or equal to the electricity-generation upper limit torque, electricity generation by the generator 9 is stopped to reduce load on the engine 2. Accordingly, in the comparative example in which the electricity-generation upper limit torque is fixed to the normal setting value Ten, the SOC of the traction battery 11 decreases as shown by a broken line from <1> to <2> in FIG. 2. In the present embodiment, however, by changing the electricity-generation upper limit torque to the higher setting value Teh, stopping of electricity generation is suppressed, or in other words, opportunities for electricity generation by the generator 9 are increased. Consequently, decrease in SOC of the traction battery 11 is suppressed as shown by a solid line from <1> to <2> in FIG. 2.

As stated above, in the present embodiment, when the SOC of the traction battery 11 decreases during traveling in parallel mode, first charging promotion control is performed to increase opportunities for electricity generation by regenerative braking, thereby suppressing decrease in SOC of the traction battery 11. Accordingly, even when relatively high-load traveling, such as high-speed traveling, continues for a long time, decrease in SOC of the traction battery 11 is suppressed by regenerative braking conducted each time the accelerator is released during high-speed traveling because of a preceding vehicle's deceleration, etc.

Further, when the SOC of the traction battery 11 decreases during traveling in parallel mode, second charging promotion control is performed to increase opportunities for parallel-mode electricity generation, thereby suppressing decrease in SOC of the traction battery 11

During traveling in parallel mode, decrease in SOC of the traction battery 11 is suppressed in the above-described manner. This means that even when high-speed traveling continues, decrease in SOC of the traction battery 11 can be suppressed, and thus events such that the vehicle cannot travel in EV mode after high-speed traveling can be suppressed. The present invention can thus provide hybrid vehicles with high usability.

When the SOC of the traction battery 11 is equal to the electricity-generation determination lower limit value Sbd or lower, first charging promotion control is performed, not disengaging the clutch 7a to shift from parallel mode to series mode, but staying in parallel mode with the clutch 7a engaged, This suppresses repeated engagement and disengagement of the clutch 7a caused by fluctuations in SOC of the traction battery 11 around the electricity-generation determination lower limit value, thereby suppressing variations in propulsion torque during traveling.

It is desirable that for the electricity-generation determination lower limit value and the SOC decrease determination reference value, not only the aforementioned hysteresis lower values Sbd, Sad but also hysteresis upper values Sbu, Sau for use in SOC upward phase of the traction battery 11 be provided so that determination will be made based on different values in SOC upward and downward phases of the traction battery 11. This suppresses frequent switching between "ON" and "OFF" of charging promotion control caused by fluctuations in SOC of the traction battery 11 around the electricity-generation determination lower limit value or the SOC decrease determination reference value, thereby suppressing influence of such SOC fluctuations on propulsion torque during traveling.

The present invention is not limited to the above-described embodiment.

The present invention is widely applicable to hybrid vehicles provided with parallel mode.

What is claimed is:

1. An operation control system for a hybrid vehicle, comprising:
a internal combustion engine mounted on the vehicle to drive drive-wheels of the vehicle,
a clutch to break or complete a power transmission line between the internal combustion engine and the drive wheels;
a generator driven by the internal combustion engine to generate electricity,
a traction battery chargeable by electricity supply from the generator, and
an electric motor supplied with electricity from the generator or the traction battery to drive drive-wheels of the vehicle, and
being capable of causing the vehicle to travel in parallel mode in which the drive wheels are driven by the internal combustion engine and the electric motor, capable of fuel cut control to stop fuel supply to the internal combustion engine during deceleration of the vehicle, and capable of regenerative braking using the electric motor, wherein
the operation control system further comprises
an SOC detecting section to detect SOC of the traction battery, and
a charging promotion control section to perform, when the vehicle traveling in parallel mode is to be decelerated and the SOC is lower than or equal to a predetermined first reference value, first charging promotion control to brake the vehicle by regenerative braking while causing the internal combustion engine to continue operating by continuing fuel supply and maintaining the clutch engaged to complete the power transmission line.

2. The operation control system according to claim 1, wherein in the first charging promotion control, the charging promotion control section causes the internal combustion engine to continue operating to produce an output torque cancelling out a friction torque occurring in the internal combustion engine.

3. The operation control system according to claim 2, wherein in the first charging promotion control, the charging promotion control section increases electricity generated by the regenerative braking to cause the internal combustion engine to continue operating to produce the output torque cancelling out the friction torque occurring in the internal combustion engine.

4. The operation control system according to claim 1, further comprising:
a target output torque calculating section to calculate a target output torque for the internal combustion engine, and
an electricity-generation restricting section to restrict electricity generation by the generator when the target output torque is greater than or equal to a predetermined threshold, wherein
when the vehicle is traveling in parallel mode and the SOC is lower than or equal to a second reference value predetermined to be higher than the first reference value, the charging promotion control section performs second charging promotion control to increase the threshold.

5. The operation control system according to claim 2, further comprising:
a target output torque calculating section to calculate a target output torque for the internal combustion engine, and
an electricity-generation restricting section to restrict electricity generation by the generator when the target output torque is greater than or equal to a predetermined threshold, wherein
when the vehicle is traveling in parallel mode and the SOC is lower than or equal to a second reference value predetermined to be higher than the first reference value, the charging promotion control section performs second charging promotion control to increase the threshold.

6. The operation control system according to claim 4, wherein when the vehicle is traveling in parallel mode and the SOC is lower than or equal to the first reference value, the charging promotion control section inhibits stopping of fuel supply in the fuel cut control.

7. The operation control system according to claim 5, wherein when the vehicle is traveling in parallel mode and the SOC is lower than or equal to the first reference value, the charging promotion control section inhibits stopping of fuel supply in the fuel cut control.

* * * * *